United States Patent [19]

Hattori et al.

[11] 4,192,268

[45] Mar. 11, 1980

[54] AIR FLOW AMOUNT ADJUSTING SYSTEM FOR AN INTERNAL COMBUSTION ENGINE

[75] Inventors: Tadashi Hattori, Okazaki; Akira Takata; Tamotsu Fukuda, both of Toyota; Takamichi Nakase, Gamagori, all of Japan

[73] Assignees: Nippon Soken, Inc., Aichi; Toyota Jidosha Kogyo Kabushiki Kaisha, Toyota, both of Japan

[21] Appl. No.: 30,953

[22] Filed: Apr. 17, 1979

Related U.S. Application Data

[63] Continuation of Ser. No. 798,948, May 20, 1977, abandoned.

[30] Foreign Application Priority Data

May 28, 1976 [JP] Japan .................................. 51-62542
May 31, 1976 [JP] Japan .................................. 51-63325

[51] Int. Cl.$^2$ .............................................. F02D 1/04
[52] U.S. Cl. ......................... 123/119 EC; 123/32 EA; 60/276
[58] Field of Search ...... 123/119 EC, 32 EA, 32 EC, 123/119 R, 139 AW, 32 EH; 60/276, 285

[56] References Cited

U.S. PATENT DOCUMENTS

| | | | |
|---|---|---|---|
| 3,871,338 | 3/1975 | Schmidt et al. ................. | 123/32 EA |
| 3,890,946 | 6/1975 | Wahl ................................ | 123/119 R |
| 3,895,611 | 7/1975 | Endo et al. ...................... | 123/32 EA |
| 3,911,884 | 10/1975 | Moriya et al. ................. | 123/139 AW |
| 4,052,968 | 10/1977 | Hattori et al. ................. | 123/119 EC |
| 4,057,042 | 11/1977 | Aono .............................. | 123/119 R |
| 4,077,207 | 3/1978 | Hattori et al. ................. | 60/276 |
| 4,077,364 | 3/1978 | Aoki ............................... | 123/32 EH |

*Primary Examiner*—Charles J. Myhre
*Assistant Examiner*—R. A. Nelli
*Attorney, Agent, or Firm*—Cushman, Darby & Cushman

[57] ABSTRACT

An air flow amount adjusting system produces an air-fuel mixture of a desirable air-fuel ratio by controlling the direction of movement of a bypass valve mounted in an additional air supply pipe adapted to supply additional air into either the intake system or exhaust system of an internal combustion engine in accordance with an output signal produced from a gas sensor mounted in the exhaust system of the engine and indicative of the air-fuel ratio of the mixture supplied to the engine. A two-level mode signal whose threshold corresponds to the desired air-fuel ratio is produced in accordance with the output signal of the gas detector. After the two-level mode signal has changed from one level to the other level, the movement of the bypass valve is stopped for a certain period of time. If desired, the stopping period of the bypass valve may be changed in accordance with the temperature of the engine.

1 Claim, 11 Drawing Figures

AIR FLOW AMOUNT ADJUSTING SYSTEM FOR AN INTERNAL COMBUSTION ENGINE

This is a continuation of application Ser. No. 798,948 filed May 20, 1977 now abandoned.

To obtain a maximum efficiency of modified engines which have been proposed for automobile exhaust emission control purposes or to ensure an optimum purification of the exhaust gases by the exhaust gas purifying catalysts mounted in engines for the similar exhaust gas emission control purposes, the air-fuel ratio of the mixtures supplied to the engine must always be controlled properly by means of additional air or alternately the amount of secondary air to the catalyst must be controlled properly.

The present invention relates to air flow amount adjusting systems for internal combustion engines which are capable of satisfactorily meeting the above-mentioned requirements.

A system of the above type has been proposed which includes a gas sensor adapted to detect the air-fuel ratio of the mixture in accordance with the concentration of oxygen, a constituent, of the exhaust gases, whereby a bypass valve is continuously operated in response to the output signal of the gas sensor to control the rate of flow of correcting additional air and thereby control the air-fuel ratio of the mixtures.

A disadvantage of this type of system is that due to disturbance or the like of the exhaust gas stream flowing past the location of the gas detector, there is the possibility of the gas detector detecting the localized oxygen content of the exhaust gases in place of the overall oxygen content causing an erroneous detection of the air-fuel ratio of the mixture which is correlated with the oxygen content, with the result that as for example, despite the fact that the air-fuel ratio of the mixture is large (lean), an instantaneous pulse-like signal indicative of a small (rich) air-fuel ratio is generated, and the bypass valve is operated erroneously.

Another disadvantage is that the gas detectors used are usually of the type which have a step output characteristic with respect to the air-fuel ratio of the mixtures as shown in FIG. 2, with the result that when the air-fuel ratio of the mixtures comes near a predetermined air-fuel ratio, the dectector output is alternately changed at very short periods, and the direction of movement of the bypass valve is rapidly changed, thus causing the bypass valve, the bypass valve support, etc., to wear rapidly and thereby deteriorating their durability.

The prior art system of the above type generally employs a pulse motor to serve as a drive unit for operating the bypass valve, and the air-fuel ratio is generally controlled by holding the operating speed of the motor constant, that is, the operating speed of the motor is set at an optimum value which minimizes variation of the air-fuel ratio both during the steady-state and transient operating conditions of an engine.

With this prior art system, however, the bypass valve is always operated continuously, and moreover no consideration is given to the effect of the delay time factor. Thus, there is a disadvantage that even if the operating speed of the motor is set at an optimum value, due to the operating speed being constant, the air-fuel ratio of the mixtures is varied greatly under the effect of the delay time factor between the time that the air-fuel ratio of the mixture is changed by additional air in the intake system and the time that the exhaust gas constituent is changed and detected by the gas detector in the exhaust system, and consequently the control range of the air-fuel ratio is increased, thus making it impossible to satisfactorily control the air-fuel ratio throughout a wide range of operating conditions of the engine.

Particularly, during low load and low rotational speed operation where the amount of intake air is small, the delay time is increased thus causing a hunting phenomenon and thereby failing to ensure a full display of the purifying function of the catalytic converter, and moreover a surging phenomenon is caused during the running of the vehicle thereby deteriorating the drivability.

With a view to overcoming the foregoing deficiencies, it is an object of this invention to provide an air flow amount adjusting system wherein noisy instantaneous pulse-like signals from a gas sensor disposed in the exhaust system of an engine are eliminated, and when the air-fuel ratio of the mixture supplied to the engine reaches a predetermined ratio the operation of means for operating a bypass valve mounted in an additional air passage is practically stopped, thereby improving the durability of the bypass valve and other associated component parts.

This object of the invention is accomplished by stopping the operation of the bypass valve for a predetermined period of time in response to a change from one level to the other of the signal from the gas detector.

It is another object of this invention to provide such air flow amount adjusting system wherein the said predetermined time period is varied in accordance with the engine tempertaure to thereby control the air-fuel ratio at a desired value.

It is still another object of the invention to provide such air flow amount adjusting system wherein each time a timing pulse synchronized with the rotation of the engine is generated, the additional air amount controlling bypass valve is intermittently operated a predetermined amount to thereby minimize the variation of the air-fuel ratio due to the delay time in the engine system.

It is still another object of the invention to provide such air flow amount adjusting system wherein during sudden acceleration or deceleration of an engine, the frequency of timing pulses is increased to thereby ensure an improved response.

It is still another object of the invention to provide such air flow amount adjusting system wherein during sudden acceleration or deceleration of an engine, the amount of movement of the bypass valve upon each timing pulse is increased over that obtained during the periods of steady-state operating conditions of the engine, thereby ensuring an improved response.

The above and further objects and novel features of the present invention will be more fully understood from the following detailed description when the same is read in connection with the accompanying drawings. It is to be expressly understood, however, that the drawings are for the purpose of illustration only and are not intended as a definition of the limits of the present invention.

The present invention will now be described in greater detail with reference to the illustrated embodiments.

Figure 1:
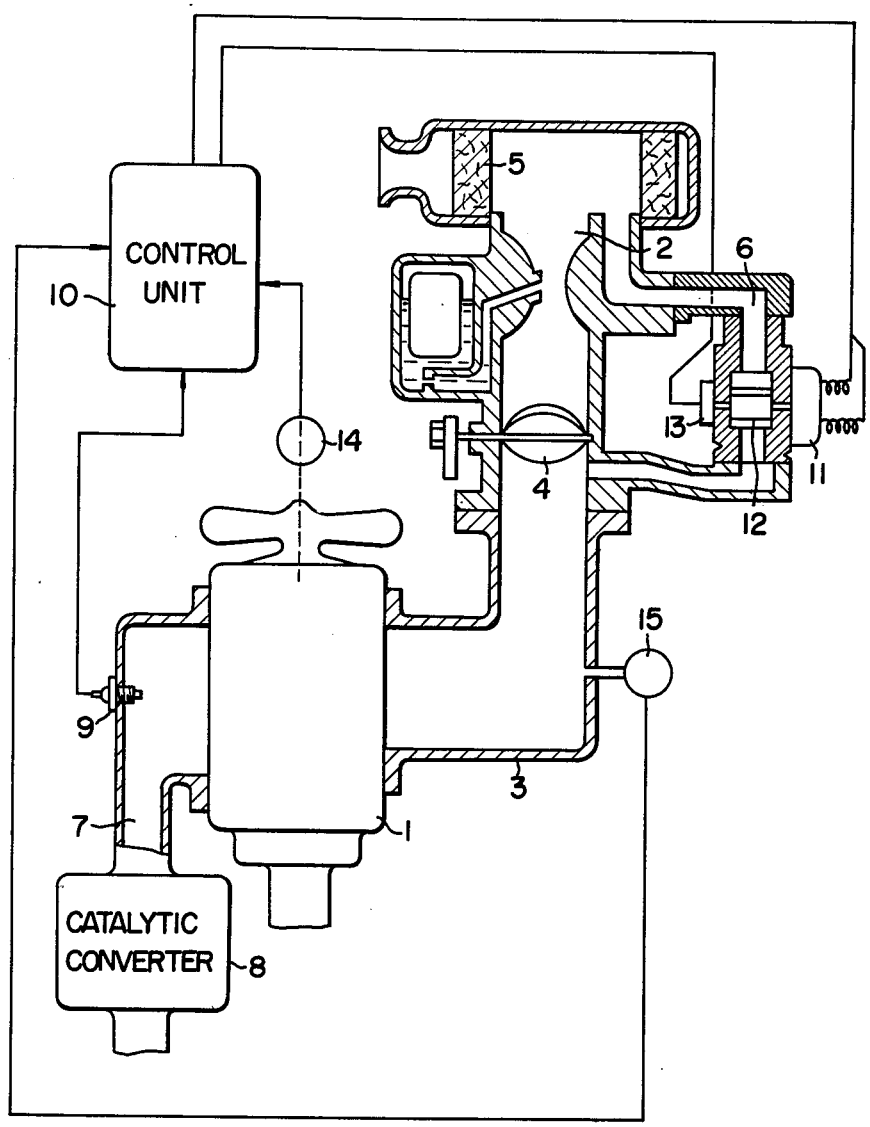
FIG. 1 is a schematic diagram showing the general construction of an air flow amount adjusting system for an internal combustion engine according to the present invention.

Referring first to FIG. 1 showing the entire system of a first embodiment of the invention, an engine 1 is designed so that it is supplied with a mixture of air and fuel from a carburetor 2 through an intake manifold 3. The engine 1 comprises for example an ordinary four-cycle reciprocal gasoline engine.

In the intake system of the engine 1, a throttle valve 4 is mounted in the downstream portion of the carburetor 2, and an air cleaner 5 is disposed upstream of the carburetor 2. An additional air passage 6 is disposed to communicate the air cleaner 5 with the carburetor 2 downstream of the throttle valve 4 and bypass the fuel nozzle of the carburetor 2 and the throttle valve 4.

Also disposed in the exhaust system of the engine 2 are an exhaust manifold 7, and a catalytic converter 8 incorporating for example a three-way catalyst, and also mounted in the exhaust manifold 7 is a gas sensor 9 which employs a metal oxide such as zirconium dioxide or titanium dioxide to detect the concentration of oxygen, a constituent, of the exhaust gases and thereby detect the air-fuel ratio of the mixture which is correlated with the oxygen concentration.

Figure 2:
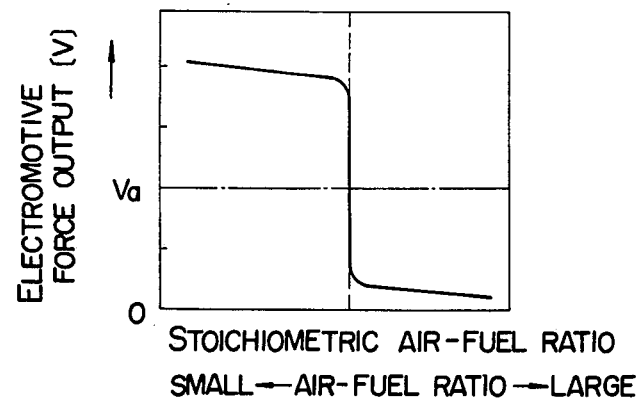
FIG. 2 is an output characteristic diagram of the gas sensor shown in FIG. 1, showing the variation of electromotive force in relation to the variation of air-fuel ratio.

In the case of the gas detector 9 employing zirconium dioxide, an electromotive force of about 1 V is produced when a mixture richer than a stoichiometric air-fuel ratio is supplied to the engine 1, whereas an electromotive force of about 100 mV is produced when the mixture supplied is leaner than the stoichiometric ratio, and thus the output electromotive force of the gas sensor 9 changes practically in a stepwise manner at around the stoichiometric ratio as shown in FIG. 2.

A control unit 10 functions to operate a pulse motor 11 in a selected direction in response to the signals from various detectors including the gas sensor 9, and the control unit 10 comprises various electronic circuits which will be described later. The pulse motor 11 functions to open and close a bypass valve 12 mounted in the additional air passage 6, and its drive shaft is coupled to the shaft of the bypass valve 12. In this embodiment, the pulse motor 11 is of the four phase, two-phase excitation mode type.

The bypass valve 12 is an ordinary square butterfly valve, and it is positioned in the additional air passage 6. The bypass valve 12 is provided with a valve fully-closed detector switch 13 which detects that the bypass valve 12 is in its fully closed position, namely, the switch 13 is turned on when the bypass valve 12 is in the fully closed position, while the switch 13 is turned off when the bypass valve 12 is in any other position, and its output signal is applied to the control unit 10.

Numerals 14 and 15 respectively designate an engine revolution detector and an acceleration/deceleration switch which are associated with another embodiment that will be described later, and therefore these detector and switch will be described in detail in connection with another embodiment.

Figure 3:
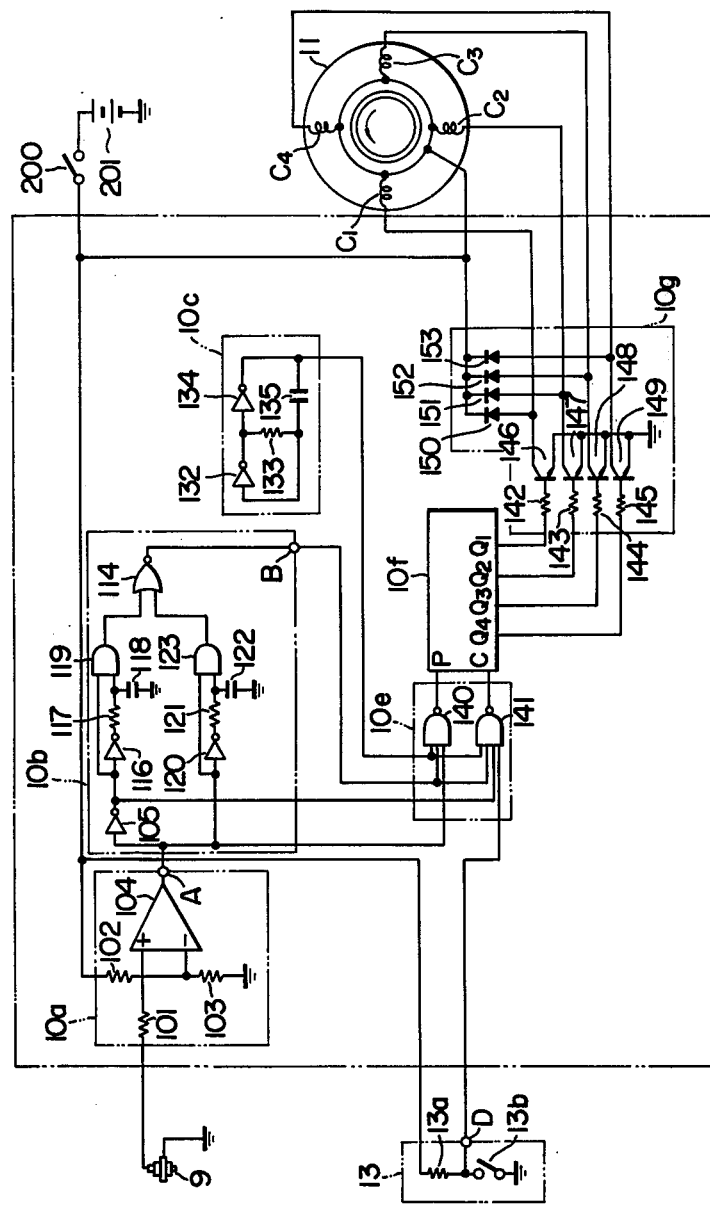
FIG. 3 is a circuit diagram showing in detail the control unit used in the first embodiment.

Next, the construction of the control unit 10 will be described in detail with reference to FIG. 3. In the Figure, numeral 10a designates an air-fuel ratio discriminating circuit for determining the relative magnitude of the output signal of the gas sensor 9, and it comprises a voltage comparison circuit including an input resistor 101, a differential operational amplifier 104 (hereinafter referred to as an OP AMP) and voltage dividing resistors 102 and 103 for applying a preset voltage to the inverting input terminal of the OP AMP 104, and the noninverting input terminal of the OP AMP 104 is connected to the gas sensor 9 through the input resistor 101. The preset voltage determined by the dividing resistors 102 and 103 is set at a value equal to the electromotive force produced by the gas sensor 9 at around the stoichiometric air-fuel ratio ($V_a$ in FIG. 2). Consequently, when the air-fuel ratio detected by the gas sensor 9 is smaller than the stoichiometric ratio or the mixture is rich as compared with the stoichiometric ratio, a "1" level signal is generated at an output terminal A of the air-fuel ratio discriminating circuit 10a whereas when the detected air-fuel ratio is greater than the stoichiometric ratio or the mixture is lean, a "0" level signal is generated at the output terminal A.

A monostable circuit 10b is designed to generate a timing pulse for a predetermined period in response to a change in the state of the output signal of the air-fuel ratio discriminating circuit 10a, and it comprises an inverter 105, a first monostable multivibrator including an inverter 116, a resistor 117, a capacitor 118 and an AND gate 119, a second monostable multivibrator including an inverter 120, a resistor 121, a capacitor 122 and an AND gate 123, and a NOR gate 114. Thus, when the output of the air-fuel ratio discriminating circuit 10a changes from the "1" level to the "0" level, the first monostable multivibrator is triggered and consequently the output of the AND gate 119 goes from the "0" level to the "1" level for a period of time which is determined by the resistor 117 and the capacitor 118. On the contrary, when the output of the air-fuel ratio discriminating circuit 10a changes from the "0" level to the "1" level, the second monostable multivibrator is triggered and consequently the output of the AND gate 123 goes from the "0" level to the "1" level for a period of time determined by the resistor 121 and the capacitor 122. The outputs of the first and second monostable multivibrators are added together by the NOR gate 114, so that the output of the monostable multivibrator 10b goes to the "0" level for a predetermined time period t as shown in (B) of FIG. 4 after the output of the air-fuel ratio discriminating circuit 10a shown in (A) of FIG. 4 has changed its state. On the other hand, when the output of the air-fuel ratio discriminating circuit 10a changes its state at a period shorter than the time period t, the output of the monostable circuit 10b remains at the "0" level during this time interval.

Numeral 10c designates a clock pulse generating circuit for generating clock pulses to operate the pulse motor 11, and it comprises an astable multivibrator including inverters 132 and 134, a resistor 133 and a capacitor 135 with its output pulse frequency being selected suitably so as to ensure an optimum control. The valve fully-closed detector switch 13 comprises a resistor 13a and contacts 13b, whereby only when the bypass valve 12 is in the fully-closed position, the contacts 13b are closed an a "0" signal is generated at its output terminal D. Numeral 10e designates a command circuit comprising NAND gates 140 and 141 and adapted to receive the output signals of the air-fuel ratio discriminating circuit 10a, the monstable circuit 10b and the valve fully-closed detector switch 13. More specifically, the input terminals of the NAND gate 140 are respectively connected to the output terminal of the clock pulse generating circuit 10c, the output terminal B of the monostable circuit 10b and the output terminal A of the air-fuel ratio discriminating circuit 10a, and its output terminal is connected to an input terminal P of a reversible shift register 10f. The input terminals of the NAND gate 141 are respectively connected to the output terminal of the clock pulse generating circuit 10c, the output terminal B of the monostable circuit 10b, the output terminal D of the valve fully-closed detector switch 13 and the output terminal A of the air-fuel ratio discrimination circuit 10a, and the output terminal of the NAND gate 141 is connected to an input terminal C of the reversible shift register 10f.

When pulse signals are applied to the input terminal P of the reversible shift register 10f, its output terminals $Q_1$, $Q_2$, $Q_3$ and $Q_4$ are sequentially shifted in this order, whereas when the pulse signals are applied to the input terminal C the output terminals $Q_4$, $Q_3$, $Q_2$ and $Q_1$ are sequentially shifted in this order. The output terminals $Q_1$, $Q_2$, $Q_3$ and $Q_4$ are connected to a switching circuit 10g comprising resistors 142, 143, 144 and 145, transistors 146, 147, 148 and 149 and back electromotive force absorbing diodes 150, 151, 152 and 153, and this switching circuit 10g is in turn connected to field coils $C_1$, $C_2$, $C_3$ and $C_4$ of the four-phase pulse motor 11. Consequently, when the pulse signals are applied to the input terminal P of the reversible shift register 10f, the transistors 146, 147, 148 and 149 are sequentially turned on and the field coils $C_1$, $C_2$, $C_3$ and $C_4$ of the pulse motor 11 are sequentially energized, thus rotating the pulse motor 11 in the direction of the arrow in FIG. 3. In response to the rotation of the pulse motor 11 in the direction of the arrow, the bypass valve 12 is operated in a direction which opens it. On the contrary, when the pulse signals are applied to the input terminal C, the pulse motor 11 is rotated in a direction opposite to the direction of the arrow and consequently the bypass valve 12 is operated in a direction which closes it.

The control unit 10 and the pulse motor 11 are supplied with power from a battery 201 through a switch 200 which is operatively associated with the key switch of the engine 1.

With the construction described above, the carburetor 2 serves the ordinary fuel measuring function, and it does not differ from the known carburetors except that it has been adjusted to produce a mixture of an air-fuel ratio which is slightly rich in fuel as compared with the desired ratio of air to fuel which is to be controlled and obtained. The regular main air is mixed with the corresponding amount of fuel and supplied to the engine 1 through the main passage of the carburetor 2 and through the intake manifold 3. After the completion of the combustion in the engine 1, the exhaust gases are discharged to the atmosphere by way of the exhaust manifold 7, the catalytic converter 8 and the muffler which is not shown, and the air-fuel ratio of the mixture supplied to the engine 1 is detected by the gas sensor 9 mounted in a portion of the exhaust passage of the exhaust manifold 7. When the electromotive force produced by the gas sensor 9 is higher than the preset value $V_a$, the air-fuel ratio discriminating circuit 10a discriminates that the air-fuel ratio of the mixture supplied to the engine 1 is small (rich) and a "1" level signal is generated at its output terminal A. Consequently, the output of the monostable circuit 10b goes to the "0" level for the duration of the predetermined time period t, and the "0" level signal is applied to the NAND gate 140 of the command circuit 10e. On the other hand, the "1" level signal from the air-fuel ratio discriminating circuit 10a is inverted by the invertor 105 to a "0" level signal, and this "0" level signal is applied to the NAND gate 141 of the command circuit 10e. As a result, both of the NAND gates 140 and 141 are closed, and the pulse signals from the clock pulse generating circuit 10c are no longer applied to the reversible shift register 10f, thus causing the pulse motor 11 to stop the movement of the bypass valve 12. After the time period t, the output of the monostable circuit 10b goes to the "1" level, and this "1" level signal is applied to the NAND gate 140. Consequently, the pulse signals from the clock pulse generating circuit 10b are applied, as the output signals of the command circuit 10e, to the input terminal P of the reversible shift register 10f through the NAND gate 140. As a result, the pulse motor 11 is rotated in the direction of the arrow so that the opening of the bypass valve 12 is increased and the amount of additional air supplied to the carburetor downstream of the throttle valve 14 is increased in accordance with the opening of the bypass valve 12, thus increasing (leaning out) the air-fuel ratio of the mixture supplied to the engine 1.

On the other hand, when the air-fuel ratio is increased by the increased amount of additional air so that the electromotive force produced by the gas sensor 9 becomes lower than the preset voltage $V_a$, the output of the air-fuel ratio discriminating circuit 10a changes its state, thus generating a "0" level signal. Thus, the bypass valve 12 is stopped by the action of the monostable circuit 10b for the duration of the predetermined time period t in the similar manner as mentioned in connection with the opening of the bypass valve 12, and thereafter a "1" level signal is applied to the NAND gate 141, thus applying the pulse signals from the clock pulse generating circuit 10c to the input terminal C of the reversible shift register 10f. When this occurs, the pulse motor 11 is rotated in the direction opposite to the direction of the arrow, and the bypass valve 12 is rotated in the direction which closes it. As a result, the amount of additional air supplied to the carburetor downstream of the throttle valve 4 is decreased, and the air-fuel ratio of the mixture supplied to the engine 1 is decreased.

In this operation, in order to prevent the air-fuel ratio discriminating circuit 10a from rotating the bypass valve 12 further and bringing it into an "overshoot" position upon failure of the mixture to attain the desired air-fuel ratio even after the bypass valve 12 has been moved into its fully closed position, when the valve fully closed detector switch 13 detects that the bypass valve 12 is in the fully-closed position, the contacts 13b are closed so that a "0" level signal is generated and the NAND gate 141 is closed, thus stopping the application of the pulse signals to the reversible shift register 10f and thereby preventing the pulse motor 11 from rotating the bypass valve 12 further in the closing direction thereof. In this way, the bypass valve 12 is allowed to operate properly.

Next, the control operation of the bypass valve 12 will be described with reference to FIG. 4. When the output of the air-fuel ratio discriminating circuit 10a changes its state at a time $t_1$ as shown in (A) of FIG. 4, the output of the monostable circuit 10b goes to the "0" level for the predetermined period t as shown in (B) of FIG. 4. Consequently, as shown in (C) of FIG. 4, the movement of the bypass valve 12 is stopped for the duration of the period t during which its opening is held constant, and thereafter the bypass valve 12 is operated in the closing direction.

Figure 4:
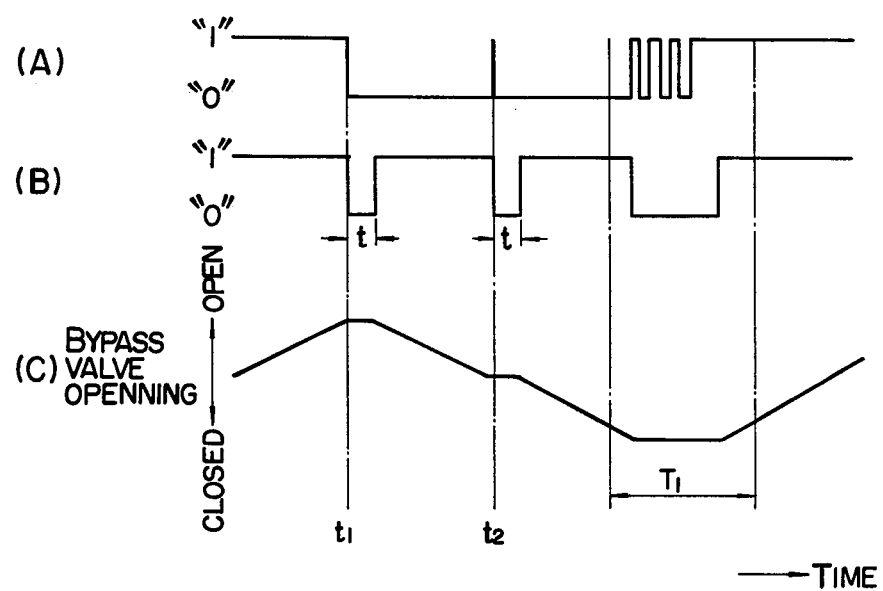
FIG. 4 is a waveform diagram useful in explaining the operation of the system of this invention in accordance with the control unit shown in FIG. 3.

In the event that the gas sensor 9 makes an erroneous detection of the oxygen concentration so that the air-fuel ratio discriminating circuit 10a generates an instantaneous pulse at a time $t_2$ as shown in (A) of FIG. 4, the movement of the bypass valve 12 is stopped for the duration of the period t by the action of the monostable circuit 10b, thus preventing the occurrence of an erroneous operation in which the direction of movement of the bypass valve 12 is changed and the valve is operated to open.

On the other hand, when the air-fuel ratios of the mixtures are at around the predetermined ratio (the stoichiometric ratio) as during a time period $T_1$ and the output of the air-fuel ratio discriminating circuit 10a changes its state at a short period as shown in (A) of FIG. 4, the output of the monostable circuit 10b is maintained at the "0" level during this time period as shown in (B) of FIG. 4, so that the bypass valve 12 is merely stopped and the valve is neither opened nor closed. Thus, during low speed and low load operation of the engine 1, the occurrence of a surging phenomenon due to any excessive supply of additional air is prevented, and wear of the bypass valve 12 and its supporting members including the bearings, etc., is reduced thus increasing their durability.

While, in the above described embodiment, the first and second monostable multivibrators of the monostable circuit 10b have the same time constant and hence the same monostable time period t, if the monostable time period of the first monostable multivibrator is made longer than that of the second monostable multivibrator, the opening of the bypass valve 12 is increased on the whole and the air-fuel ratio of the mixture is controlled at a valve larger (leaner) than the stoichiometric air-fuel ratio, whereas if the monostable time period of the first monostable multivibrator is made shorter than that of the second monostable multivibrator, the opening of the bypass valve 12 is decreased on the whole and the air-fuel ratio of the mixture is controlled at a value smaller (richer) than the stoichiometric air-fuel ratio.

Figure 5:
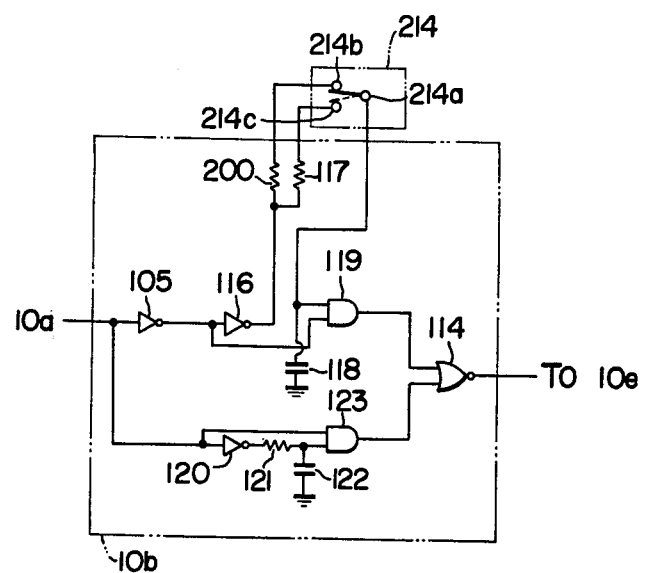
FIG. 5 is a circuit diagram showing the principal parts of a modification of the control unit shown in FIG. 3.

FIG. 5 shows a modification of the monostable circuit 10b. The monostable circuit 10b shown in FIG. 5 further comprises a resistor 200 whose resistance value is smaller than that of the resistor 117 (the resistor 121), and the time constant of the monostable circuit 10b is changed by selectively inserting the resistors 117 and 200 by means of a warm-up detector 214 in which contacts 214a and 214b are closed when the engine 1 is cold, whereas the contacts 214a and 214c are closed when the engine 1 has warmed up. In this way, before and during warm-up operation of the engine 1 the first and second monostable multivibrators have different time constants, thus controlling the air-fuel ratio of the mixture at a value richer than the stoichiometric air-fuel ratio and thereby ensuring smooth and satisfactory operation of the engine, and after the engine 1 has warmed up the first and second monostable multivibrators have the same time constant and the engine is returned to the normal operation where it is supplied with a mixture having the stoichiometric air-fuel ratio.

The warm-up detector 214 may comprise a thermo switch which detects for example the temperature of the cooling water or cylinder block of the engine 1.

A second embodiment of the invention will now be described. While, in the first embodiment, the pulse motor is continuously operated by pulses of a fixed frequency, in the below-mentioned second embodiment the pulse motor is intermittently operated and the amount of additional air is controlled by taking the delay time factor of the engine into account. For this purpose, the control unit used in this embodiment detects the engine rotational speed and acceleration or deceleration of the engine.

Referring to FIG. 1 showing the general construction of the system of this invention, an engine revolution detector 14 generates signals in synchronism with the crankshaft revolution of the engine 1 or in accordance with the rotational speed of the engine 1, namely, in this embodiment the intermittent signal from the primary winding of the ignition coil generally utilized as the ignition system of the engine 1 is employed, and the output signal of the engine revolution detector 14 is applied to a control unit 10.

An acceleration/deceleration switch 15 is disposed in the intake manifold 3, and it is adapted to be turned on and off electrically in response to changes in the intake manifold vacuum. Namely, during the periods of acceleration and deceleration operation of the engine 1 where the intake manifold vacuum changes rapidly, the switch 15 is turned on and its output signal is applied to the control unit 10.

Figure 6:
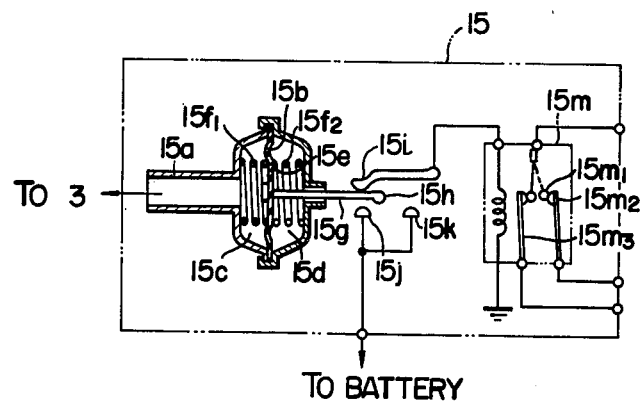
FIG. 6 is a sectional view showing the construction of an acceleration/deceleration switch used in a second embodiment.

The construction of the acceleration/deceleration switch 15 is of the diaphragm type as shown in FIG. 6. Now referring to the Figure, the switch 15 includes two chambers 15c and 15d which are defined by a casing 15a and a diaphragm 15b, and the two chambers are communicated with each other through an orifice 15e in the diaphragm 15b. Also back springs $15f_1$ and $15f_2$ are respectively mounted in the chambers 15c and 15d to urge the diaphragm 15b, and the chamber 15c is communicated with the intake manifold 3. An electrically conductive shaft 15g is securely attached to the diaphragm 15b, and a contact 15h is formed at the forward end of the shaft 15g. A slide terminal 15i is disposed so as to always contact with the shaft 15g, and also terminals 15j and 15k are disposed so as to contact with the shaft 15g at the predetermined positions thereof. A relay 15m is operated in response to engagement and disengagement of the terminal 15g with the terminals 15j and 15k, so that contacts $15m_1$ and $15m_2$ are closed in response to the engagement of the terminals, while the contacts $15m_1$ and $15m_3$ are closed in response to the disengagement of the terminals. In this way, the position of the relay 15m is changed depending on whether the engine 1 is at the acceleration/deceleration operation.

The engine revolution detector 14 and the acceleration/deceleration switch 15 constitute a delay time detecting unit for detecting the delay time factor of the engine 1. The remaining parts of the second embodiment shown in FIG. 1 are the same as described in connection with the first embodiment.

Figure 7:
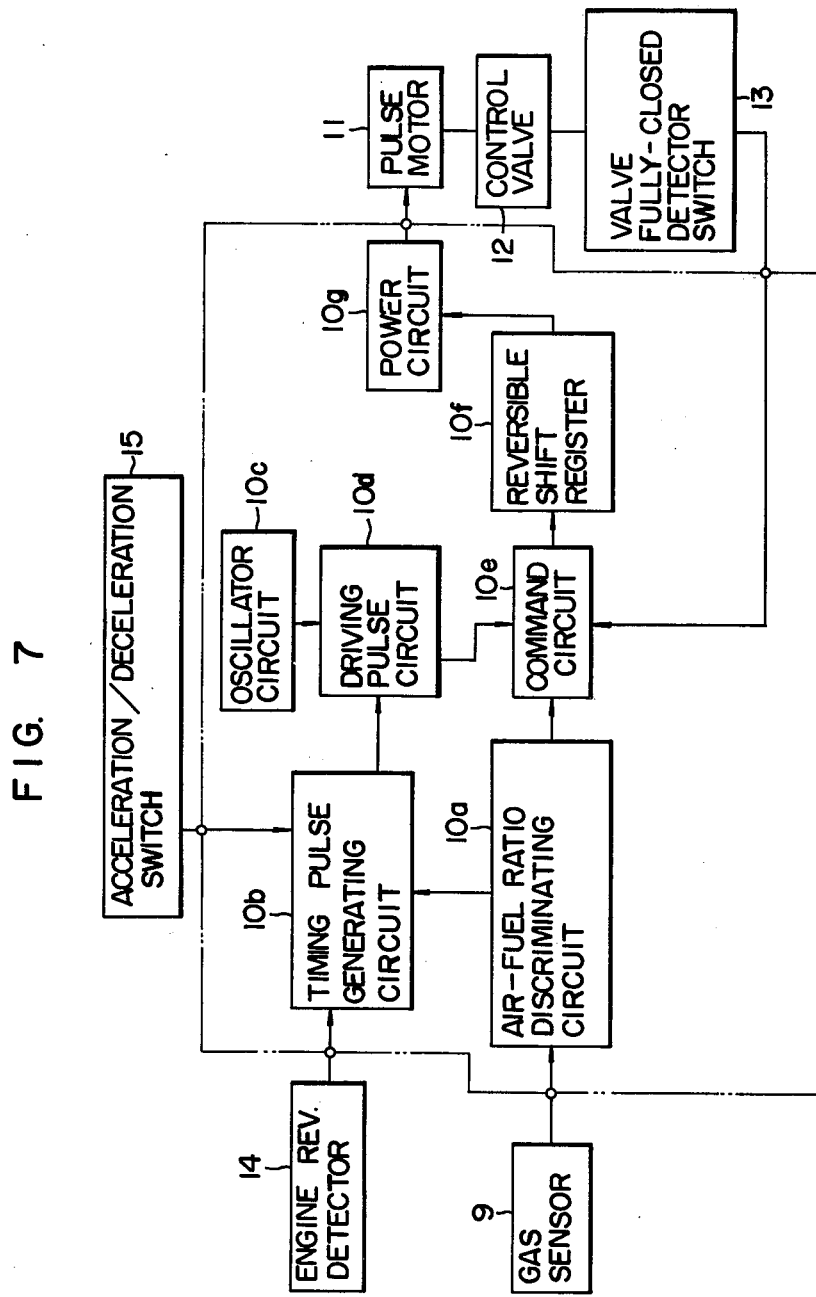
FIG. 7 is a block diagram showing a second embodiment of the control unit.

Next, the construction of the control unit 10 will be described with reference to FIG. 7 showing its block diagram. The control unit 10 receives as its input signals the output signal of the gas sensor 9 or an air-fuel signal corresponding to the oxygen content of the exhaust gases which is closely related with the air-fuel ratio of the mixture, the output signals of the engine revolution detector 14 and the acceleration/deceleration switch 15 constituting the delay time detecting unit and the output signal of the valve fully-closed detector switch 13. The control unit 10 comprises an air-fuel ratio discriminating circuit 10a for discriminating the air-fuel ratio signal from the gas sensor 9, a timing pulse generating circuit 10b for generating timing pulses of a period corresponding to the delay time factor of the engine 1, an oscillator circuit 10c for generating clock pulses of a predetermined frequency, a driving pulse circuit 10d responsive to the timing pulse and the clock pulses to generate driving pulses for driving the pulse motor 11, a command circuit 10e for performing the logical operation on the output signals of the air-fuel ratio discriminating circuit 10a and the driving pulse circuit 10e, a reversible shift register 10f whose output signals are sequentially shifted in response to the signals from the command circuit 10e, and a power circuit 10g responsive to the output signals of the reversible shift register 10f to control the energization of the pulse motor 11, thereby causing the pulse motor 11 to operate properly.

Figure 8:
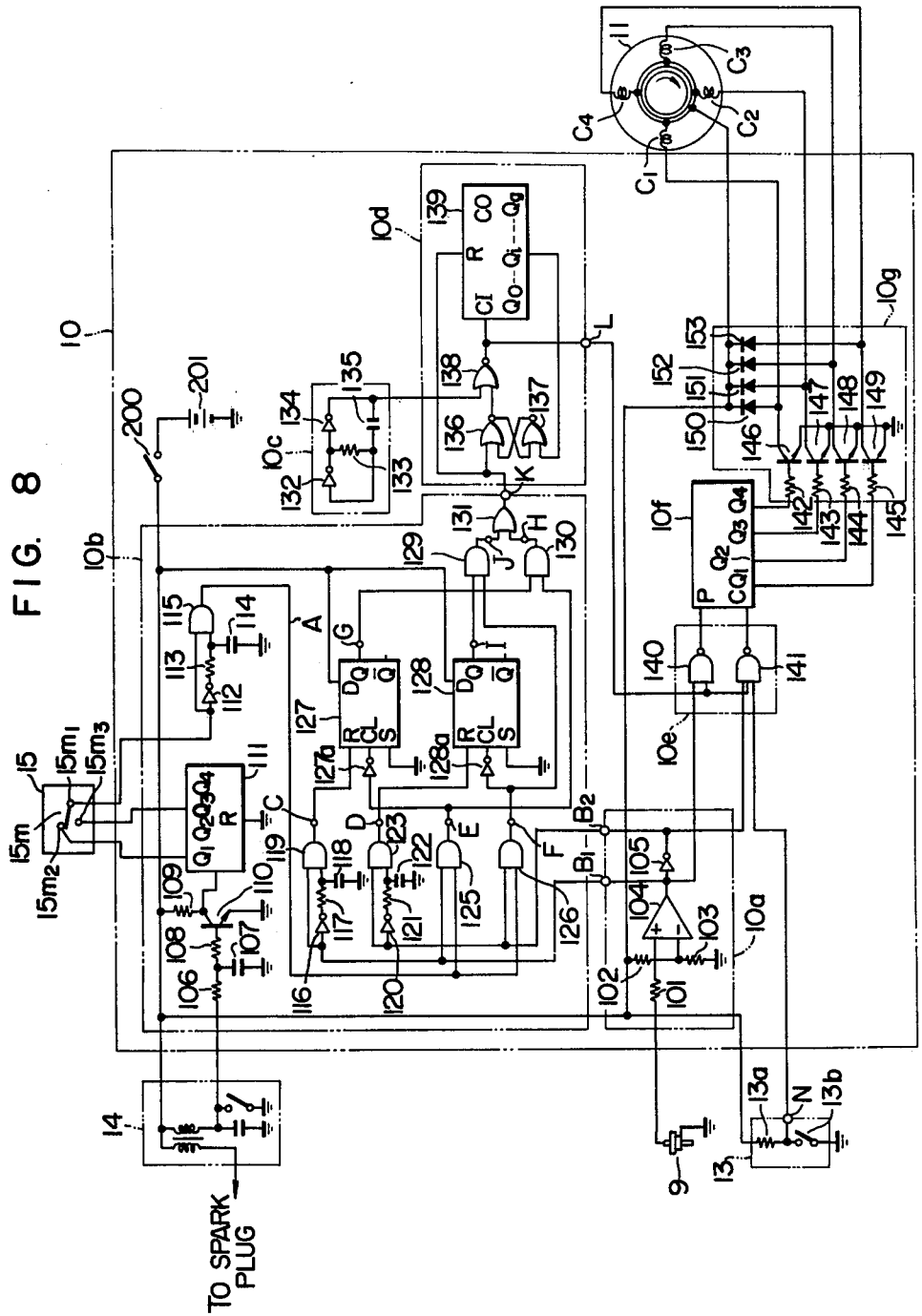
FIG. 8 is a detailed circuit diagram for the block diagram shown in FIG. 7.

The control unit 10 will now be described in greater detail with reference to FIG. 8. The air-fuel ratio discriminating circuit 10a comprises an input resistor 101, voltage dividing resistors 102 and 103 and a differential operational amplifier 104 (hereinafter referred to as an OP AMP), and the OP AMP 104 has its noninverting input terminal connected to the gas sensor 9 through the input terminal 101 and its inverting input terminal connected to the voltage dividing point of the dividing resistors 102 and 103. The output signal of the gas sensor 9 is compared with a preset voltage $V_a$ determined by the dividing resistors 102 and 103 (the voltage equal to the electromotive force produced by the gas sensor 9 at around the stoichiometric air-fuel ratio), whereby a "1" level output is generated at an output terminal $B_1$ of the air-fuel ratio discriminating circuit 10a when the output signal of the gas sensor 9 is higher than the preset voltage or the mixture is richer than the stoichiometric air-fuel ratio, whereas a "0" level output is generated at the output terminal $B_1$ when the output signal of the gas sensor 9 is lower than the preset voltage or the mixture is leaner than the stoichiometric air-fuel ratio, and a signal opposite to the output at the terminal $B_1$ is generated at an output terminal $B_2$. The timing pulse generating circuit 10b comprises a reshaper circuit including resistors 106, 108 and 109, a capacitor 107 and a transistor 110, a binary counter 111, a first differentiated pulse circuit including an inverter 112, a resistor 113, a capacitor 114 and an AND gate 115, a second differentiated pulse circuit including an inverter 116, a resistor 117, a capacitor 118 and an AND gate 119, a third differentiated pulse circuit including an inverter 120, a resistor 121, a capacitor 122 and an AND gate 123, AND gates 125 and 126, D-type flip-flops 128 and 127, AND gates 129 and 130, an OR gate 131, and inverters 127a and 128a.

The pulse signals at the primary winding of the ignition coil constituting the engine revolution detector 14 are reshaped by the reshaper circuit and then subjected to frequency division by the binary counter 111. The frequency dividing ratio is determined by the acceleration/deceleration switch 15, and in this embodiment it is so preset that an output $Q_1$ (the output divided by 2) is generated at acceleration or deceleration operation of the engine 1, and an output $Q_3$ (the output divided by 8) is generated during any other operation of the engine 1. The first differentiated pulse circuit produces from the frequency divided output of the binary counter 111 positive differentiated pulses as shown in (A) of FIG. 9.

It will be seen from the foregoing that these differentiated pulses or timing pulses are generated in synchronism with the rotation of the engine and have a period inversely proportional to the engine rotational speed, and the period of timing pulses during periods of acceleration and deceleration becomes ¼ the period obtained during periods of normal operation. The second and third differentiated pulse circuits receive as their input signals the outputs of the air-fuel ratio discriminating circuit 10a, so that the second differentiated pulse circuit generates positive differentiated pulses as shown in (C) of FIG. 9 when the output at the terminal $B_1$ of the air-fuel ratio discriminating circuit 10a changes from the "0" level to the "1" level (when the mixture is richer), and the third differentiated pulse circuit generates positive differentiated pulses as shown in (D) of FIG. 9 when the output at the terminal $B_2$ of the air-fuel ratio discriminating circuit 10a changes from the "0" level to the "1" level (when the mixture is leaner).

Figure 9:
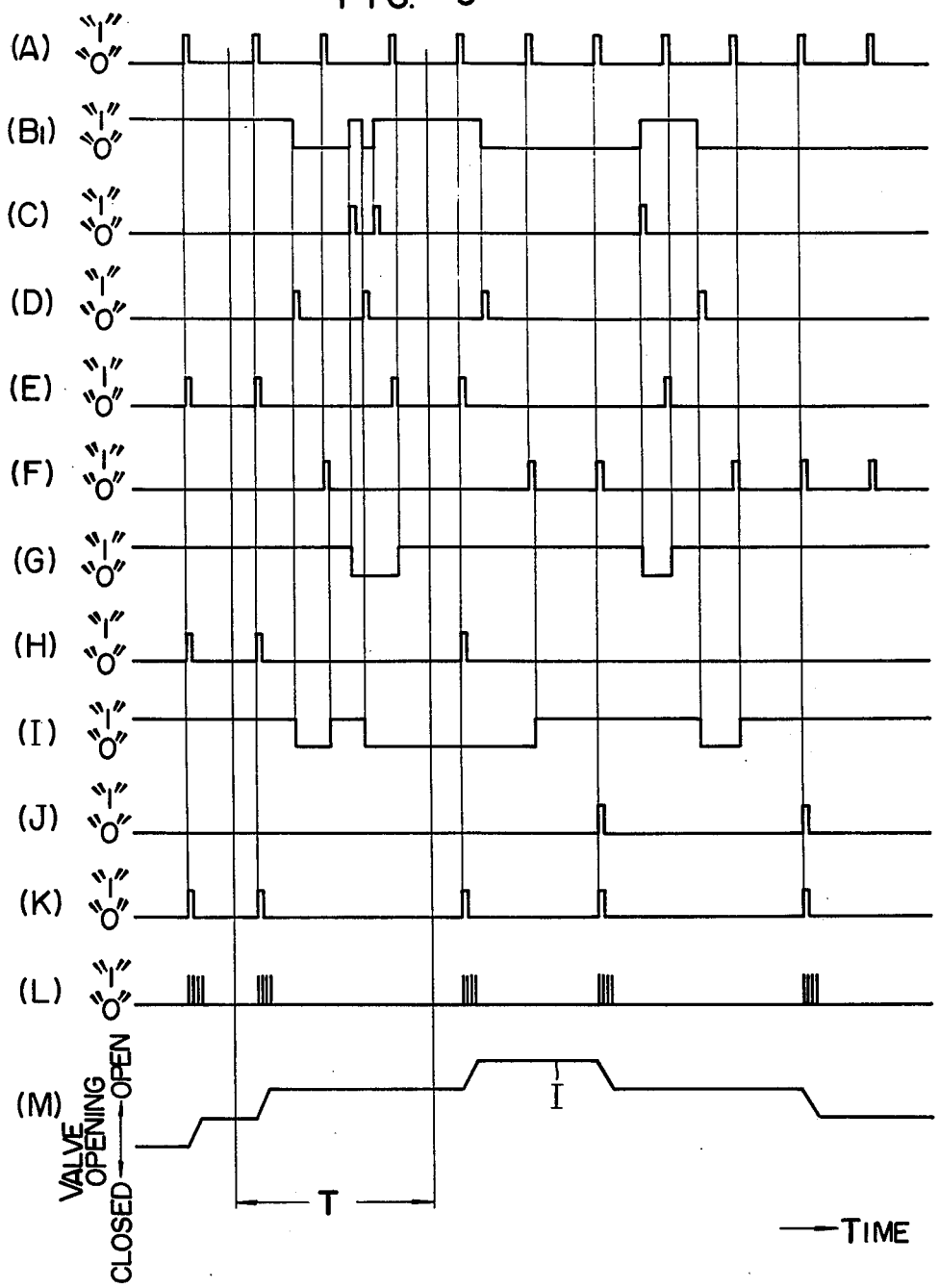
FIG. 9 is a waveform diagram useful in explaining the operation of the system of this invention in accordance with the control unit shown in FIG. 8.

The AND gates 125 and 126 receive the outputs of the first differentiated pulse circuit and the air-fuel ratio discriminating circuit 10a as gate input signals, so that when the output at the terminal $B_1$ of the air-fuel ratio discriminating circuit 10a goes to the "1" level, the AND gate 125 is opened and the differentiated pulses from the first differentiated pulses are passed as shown in (E) of FIG. 9, and when the output at the terminal $B_2$ of the air-fuel ratio discriminating circuit 10a goes to the "1" level, the AND gate 126 is opened and the differentiated pulses from the first differentiated pulse circuit are passed as shown in (F) of FIG. 9.

The D-type flip-flops 127 and 128 have their set terminals S grounded and their delay terminals D connected to the power source, and the D-type flip-flop 127 receives as its input signals the output of the second differentiated pulse circuit at its reset terminal R and the output of the AND gate 125 at its clock terminal CL through the inverter 127a. The D-type flip-flop 128 receives as its input signals the output of the third differentiated pulse circuit at its reset terminal R and the output of the AND gate 126 at its clock terminal CL through the inverter 128a.

Each of the D-type flip-flops 127 and 128 is so designed that the output Q is reset to the "0" level when a "1" level reset signal is applied to the reset terminal R, and the output Q changes from the "0" level to the "1" level when the input at the clock terminal CL goes from the "0" level to the "1" level. Thereafter, even if the input signal at the clock terminal changes its state, the output Q remains at the "1" level unless a "1" level reset signal is applied to the reset terminal R.

Consequently, the output Q (at a terminal G) of the D-type flip-flop 127 becomes as shown in (G) of FIG. 9 in response to the outputs of the second differentiated pulse circuit and the AND gate 125 shown respectively in (C) and (E) of FIG. 9, and the output Q (at a terminal I) of the D-type flip-flop 128 becomes as shown in (I) of FIG. 9 in response to the outputs of the third differentiated pulse circuit and the AND gate 126.

The outputs of the D-type flip-flops 127 and 128 are respectively subjected, along with the outputs E and F of the AND gates 125 and 126, to the logical operation by the AND gates 130 and 129, so that the resulting output H of the AND gate 130 becomes as shown in (H) of FIG. 9, and the resulting output J of the AND gate 129 becomes as shown in (J) of FIG. 9.

In other words, when the output signal of the air-fuel ratio discriminating circuit 10a changes from one level to the other level, the D-type flip-flop 127 or 128 is reset to the "0" level, after which the output of the D-type flip-flop 127 or 128 is changed to the "1" level in response to the change from "1" to "0" of the first differentiated pulse generated from the first differentiated pulse circuit in synchronism with the rotation of the engine, and consequently the AND gate 130 or 129 cancels the first differentiated pulse generated after the output signal of the air-fuel ratio discriminating circuit 10a has changed from one level to the other level. When the output signal of the air-fuel ratio discriminating circuit 10a thereafter remains unchanged, the second differentiated pulse et seq. are inverted and passed through the AND gate 130 or 129.

The OR gate 131 performs the logical operation on the outputs of the AND gates 130 and 129, so that the AND gate outputs shown in (H) and (J) of FIG. 9 are superposed one upon another and consequently the output of the OR gate 131 becomes as shown in (K) of FIG. 9.

However, if the output of the air-fuel ratio discriminating circuit 10a changes from "0" to "1" or from "1" to "0" during the one cycle period of the timing pulses shown in FIG. 9, the first timing pulse after the change has taken place is cancelled, and when the period of change in the output of the air-fuel ratio discriminating circuit 10a becomes longer than the period of timing pulses, the timing pulses are passed through the OR gate 131.

The oscillator circuit 10c comprises inverters 132 and 134, a resistor 133 and a capacitor 135, and it produces basic clock pulses for driving the pulse motor 11.

The driving pulse circuit 10d comprises an R-S flip-flop including NOR gates 136 and 137, a NOR gate 138 and a decade counter 139. When a "1" level differentiated pulse is applied to a reset terminal R of the decade counter 139, its outputs $Q_0$ to $Q_9$ are all reset to the "0" level. The counting occurs each time the clock pulse applied to its carry-in terminal CI changes from the "0" level to the "1" level, and the output is generated one at a time at $Q_0$, $Q_1$, . . . and $Q_9$. In this embodiment the decade counter 139 is of the type which completes its counting after counting to the base 10, and a "1" level signal is generated at its carry-out terminal CO upon completion of the counting. The R-S flip-flop is designed so that the NOR gate 136 is triggered by the timing pulse from the timing pulse generating circuit 10b so that the output of the NOR gate 136 goes to the "0" level and the NOR gate 138 is opened, thus applying the clock pulses from the oscillator circuit 10c to the carry-in terminal CI of the decade counter 139. At the same time, the decade counter 139 is reset by the timing pulse and thus the decade counter 139 starts its counting operation in response to the application of the timing pulse. When the decade counter 139 counts i clock pulses, its $Q_i$ output goes to the "1" level, and the NOR gate 137 of the R-S flip-flop is triggered. Consequently, the output of the NOR gate 136 goes to the "1" level and the NOR gate 138 is closed, thus causing the decade counter 139 to stop counting.

As a result, as shown in (L) of FIG. 9, i clock pulses are generated as the output of the NOR gate 138 in response to each timing pulse, that is, a certain number of driving pulses are generated during each predetermined time interval. In this embodiment, the number of driving pulses generated is preset at an optimum value so that the control range of air-fuel ratio is reduced during the periods of both steady-state conditions and transient conditions. The driving pulses shown in (L) of FIG. 9 are applied to the command circuit 10e, and consequently the pulse motor 11 is operated in response to the signals from the air-fuel ratio discriminating circuit 10a in the similar manner as in the case of the previously described first embodiment.

The operation of the second embodiment of the invention described so far with reference to FIGS. 1 and 6 to 8, particularly the operation of the bypass valve 12 will now be described with reference to FIG. 9.

The timing pulse generating circuit 10b generates timing pulses as shown in (A) of FIG. 9 in response to the signals from the engine revolution detector 14 and the acceleration/deceleration switch 15. Although not shown, it is so arranged here that during the periods of acceleration and deceleration operation, the period of timing pulses is reduced to about ¼ of the period obtained during the periods of normal operation, though it is dependent on the rotational speed of the engine 1.

On the other hand, shown in ($B_1$) of FIG. 9 is the output $B_1$ of the air-fuel ratio discriminating circuit 10a adapted to discriminate the output signal of the gas sensor 9 which varies with variation in the air-fuel ratio of the mixtures produced in the carburetor 2.

Thus, the direction of rotation of the pulse motor 11 is determined by the air-fuel ratio signal shown in ($B_1$) of FIG. 9, and the driving timing and driving time period (driving angle) are determined by the driving pulses shown in (L) of FIG. 9, thus driving the pulse motor 11 intermittently. This operation is shown in terms of the opening of the bypass valve 12 by the broken line I in (M) of FIG. 9, and it will be seen from (M) of FIG. 9 that the pulse motor 11 is operated for predetermined time periods in synchronism with the rotation of the engine, and that the bypass valve 12 is temporarily stopped during other time periods.

Thus, in accordance with the second embodiment, the pulse motor 11 is operated through a predetermined angle during a predetermined time period in response to each timing pulse, and the pulse motor 11 is temporarily stopped during other time periods, thus performing this operation repeatedly. As a result, the amount of additional air supplied to the intake manifold 3 from the additional air passage 6 is increased and decreased intermittently.

This makes it possible to increase the driving speed (the slope of the broken line I in (M) of FIG. 9) of the bypass valve 12 by the pulse motor 11, thus improving the response of the bypass valve 12 and making the variation of the air-fuel ratio of the mixtures small.

Further, in accordance with the second embodiment, during the transient conditions such as the periods of acceleration and deceleration where there occurs a sudden change in the amount of intake air, the period of timing pulses is reduced to about ¼ the period obtained during the periods of normal operation thereby greatly reducing the operating cycle of the pulse motor 11, with the result that the opening of the bypass valve 12 is rapidly changed and the air-fuel ratio of the mixture is rapidly returned to the desired air-fuel ratio.

Still further, in accordance with the second embodiment, where the engine rotational speed is high and the amount of intake air is large, the period of timing pulses is decreased in proportion to the engine rotational speed, so that the operating cycle of the pulse motor 11 is decreased and the opening of the bypass valve 12 is changed rapidly, thus rapidly returning the air-fuel ratio of the mixture to the desired ratio without the air-fuel ratio being varied greatly by the delay time factor of the engine 1. On the contrary, where the engine rotational speed is low and the amount of intake air is small, the operating cycle of the pulse motor 11 is increased and the opening of the bypass valve 12 is changed slowly on the whole, thereby complying with the increase in the delay time of the engine 1. In this way, the possibility of excessive additional air supply in the low engine speed range is eliminated and the variation in the air-fuel ratio of the mixtures is decreased, thus preventing the occurence of a surging phenomenon of the engine 1.

By thus driving and stopping the pulse motor 11 intermittently with timing pulses having a period corresponding to the delay time of the engine 1 and by repeating this operation, the amount of additional air can be controlled properly throughout a wide range of the engine operating conditions.

Still further, in accordance with the second embodiment, even if the air-fuel ratio discriminating circuit 10a generates an instantaneous pulse or where the air-fuel ratios of the mixtures are at around the predetermined air-fuel ratio (the stoichiometric ratio) thus causing the output of the air-fuel ratio discriminating circuit 10a to change from one level to the other level and vice versa at short periods as shown in the region T of FIG. 9, the pulse motor 11 will not be operated unless the output of the discriminating circuit 10a remains at the same level for the duration of a time period during which are generated at least two of the timing pulses shown in (A) of FIG. 9, thus maintaining the bypass valve 12 stationary. Consequently, the bypass valve 12 is prevented from mulfunctioning or the direction of movement of the bypass valve 12 is prevented from being changed at short cycles, thereby ensuring stable control of the air-fuel ratio of the mixtures.

Of course, when the air-fuel ratio of the mixture deviates from the predetermined ratio, as mentioned previously, the bypass valve 12 is operated in response to each timing pulse, thus changing the opening of the bypass valve 12 and thereby satisfactorily and stably controlling the air-fuel ratio at the predetermined ratio.

Figure 10:
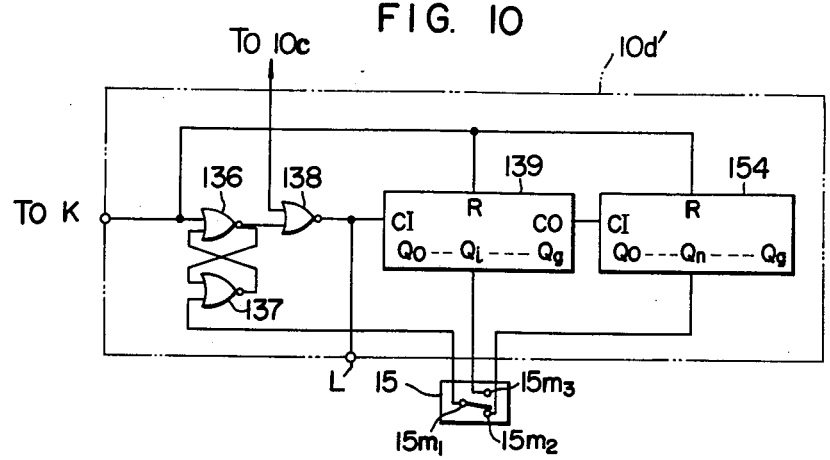
FIG. 10 is a circuit diagram showing the principal parts of a modification of the control unit shown in FIG. 8.

While, in the second embodiment, the period of timing pulses is changed during the periods of acceleration and deceleration by the binary counter 111 constituting a frequency divider, the same effect may be obtained by using a driving pulse generating circuit 10d' whose principal parts are shown in FIG. 10. This circuit differs from the driving pulse generating circuit 10d of FIG. 8 in that there is further provided a decade counter 154 having its carry-in terminal CI and reset terminal R respectively connected to the carry-out terminal CO and the reset terminal R of the decade counter 139, and the outputs of the decade counters 139 and 154 are selectively delivered by the acceleration/deceleration switch 15.

With this construction, while the period of timing pulses is not changed during the periods of acceleration and deceleration, the number of clock pulses generated in response to each timing pulse is selected to be either 0 to 9 or 10 to 99, and consequently the duty cycle of driving pulses is changed, thus changing the driving time period of the pulse motor 11 and thereby rapidly changing the opening of the bypass valve 12 during the periods of acceleration and deceleration.

Figure 11:
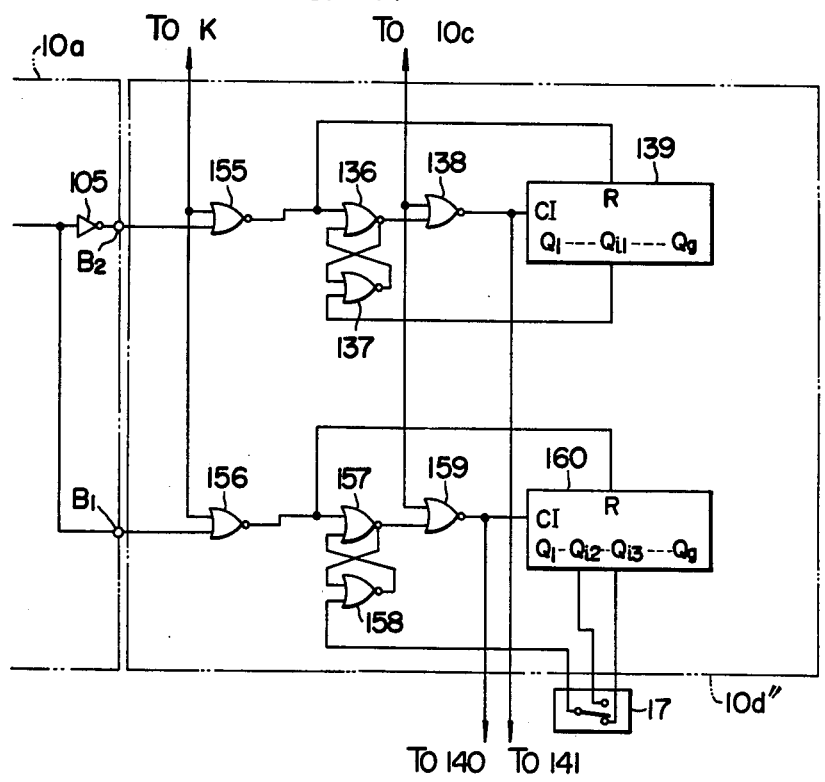
FIG. 11 is a circuit diagram showing the principal parts of another modification of the control unit shown in FIG. 8.

Further, while, in the second embodiment, the number of clock pulses generated from the driving pulse generating circuit 10d in response to each timing pulse is the same and hence the driving time period is the same for both opening and closing the bypass valve, it is possible to use a driving pulse generating circuit 10d" whose principal parts are shown in FIG. 11. This circuit differs from the driving pulse generating circuit 10d of FIG. 8 in that there are further provided NOR gates 155, 156 and 159, an R-S flip-flop including NOR gates 157 and 158 and a decade counter 160, with the NOR gate 155 being connected to the output terminal K of the timing pulse generating circuit 10b and the terminal B₂ of the air-fuel ratio discriminating circuit 10a and the NOR gate 156 being connected to the output terminal K and the terminal B₁ of the air-fuel ratio discriminating circuit 10a, whereby the decade counter 139 determines the number of driving pulses for closing the bypass valve, and the decade counter 160 determines the number of driving pulses for opening the bypass valve.

With this construction, the number of clock pulses produced in response to each timing pulse for opening the bypass valve differs from that for closing the bypass valve and consequently the rate of change for opening the bypass valve differes from that for closing the bypass valve, thus controlling the air-fuel ratio of the mixture at a value other than the stoichiometric ratio.

Consequently, if, as shown in FIG. 11, a warmup sensor 17 (e.g., an engine cooling water temperature sensor) adapted for switching in accordance with the warm-up condition of the engine 1 is provided to change the output of the decade counter 160, during the warming up period the air-fuel ratio of the mixture can be controlled at a value smaller than the stoichiometric ratio to thereby ensure a stable warm-up operation. In this case, the decade counter is preset in such a manner that $Qi_1 = Qi_3 > Qi_2$. Of course, the desired air-fuel ratio can be suitably changed depending on the setting of the decade counter.

The present invention is not intended to be limited to the above-described embodiments. For example, while, in the above-described embodiments, the present invention has been shown as applied to an air flow amount adjusting system for controlling the air-fuel ratio of the mixtures produced in the carburetor, the present invention may also be applied to a system designed to compensate the air flow in mechanically controlled or electronically controlled fuel injection systems.

Further, in addition to controlling the flow rate of air in the intake system, the present invention may be applied to a system designed to control the flow rate of air in the exhaust system, e.g., the control of the amount of secondary air to the catalyst.

Still further, while the drive unit comprises a pulse motor, any of DC or AC motors may be employed or alternately any of mechanical actuators may be employed in addition to electrical actuators.

Still further, while the delay detecting means comprises the engine revolution detector 14 and the acceleration/deceleration switch 15, detectors for detecting other delay time factors such as intake manifold vacuum, intake air amount, venturi vacuum, throttle angle, vehicle speed, etc., may be employed singly or in any combination thereof.

If the detector used is one whose output varies analogically, the period of timing pulses may be changed analogically by for example a voltage-to-frequency converter in place of the frequency divider.

It will thus be seen from the foregoing that the present invention has among its great advantages the fact that during the steady-state conditions of an engine, a constituent of the exhaust gases is detected to thereby control the amount of additional air throughout a wide range of the engine operating conditions by taking the delay time factor into consideration. Another advantage is that since malfunctioning of the bypass valve 12 can be prevented, if the invention is applied to the control of the air-fuel ratio of the mixtures, there is a great effect of reducing the variation of the air-fuel ratio and maintaining the air-fuel ratio substantially constant and thereby ensuring effective utilization of the engine exhaust purifying catalyst. Still another advantage is that the occurrence of surging phenomenon during low load and low speed operation can be eliminated thus ensuring improved driveability.

What is claimed is:

1. In an additional air supply system for an internal combustion engine comprising:
    a combustion chamber for producing combustion therein;
    an intake system operatively communicated with said combustion chamber for supplying thereto an air-fuel mixture;
    an exhaust system operatively communicated with said combustion chamber for conveying an exhaust gas from said combustion chamber to the atmosphere;
    an additional air supply pipe communicated with at least one of said intake and exhaust systems for supplying additional air thereto, thereby controlling the air-fuel ratio of said air-fuel mixture at a desired value;
    air-fuel ratio detecting means disposed in said exhaust system for detecting the air-fuel ratio of the air-fuel mixture supplied with said additional air;
    control means operatively disposed in said additional air supply pipe for controlling the amount of the additional air to be supplied;
    a timing pulse generating circuit for generating time pulses in a timed relationship with the running speed of said engine;
    drive means operatively connected with said control means for driving the same; and
    a control circuit electrically connected with said air-fuel ratio detecting means and said drive means for intermittently actuating said drive means in response to said timing pulses and the detected air-fuel ratio;
    the improved control circuit comprising:
        an air-fuel ratio discriminating circuit connected with said air-fuel ratio detecting means for comparing the output from said detecting means with a preset level and for generating a high level or a low level signal based on the comparison;
        means for stopping the actuation of said drive means in response to change of said signal from one level to the other for a period including at least the first timing pulse following a level change, to prevent an erroneous operation of said control means, including first means for producing a transition signal when said level signal changes from one level to the other level, latch means connected to said first means and to said pulse generating circuit for shifting to a block condition upon receipt of said transition signal and to an unblock condition upon receipt thereafter of a succeeding timing pulse, and logic means connected to said latch means and connecting said discriminating circuit to said drive means while said latch means is in said block condition.

* * * * *